United States Patent
Kothari

(10) Patent No.: US 7,630,123 B2
(45) Date of Patent: Dec. 8, 2009

(54) METHOD AND DEVICE FOR COMPENSATING FOR COLOR SHIFT AS A FUNCTION OF ANGLE OF VIEW

(75) Inventor: Manish Kothari, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 339 days.

(21) Appl. No.: 11/040,824

(22) Filed: Jan. 21, 2005

(65) Prior Publication Data

US 2006/0077522 A1  Apr. 13, 2006

Related U.S. Application Data

(60) Provisional application No. 60/613,978, filed on Sep. 27, 2004.

(51) Int. Cl.
*G02B 26/08* (2006.01)
*G02F 1/29* (2006.01)
*G02B 26/00* (2006.01)

(52) U.S. Cl. .................. 359/298; 359/290; 359/291

(58) Field of Classification Search .......... 359/291, 359/290, 292, 295, 298
See application file for complete search history.

(56) References Cited

U.S. PATENT DOCUMENTS

| | | | |
|---|---|---|---|
| 3,813,265 A | 5/1974 | Marks | |
| 4,832,459 A | 5/1989 | Harper | |
| 4,850,682 A | 7/1989 | Gerritsen | |
| 4,961,617 A | 10/1990 | Shahidi | |
| 4,974,942 A | 12/1990 | Gross | |
| 5,289,300 A | 2/1994 | Yamazaki | |
| 5,293,272 A | 3/1994 | Jannson et al. | |
| 5,398,125 A | 3/1995 | Willett et al. | |
| 5,452,385 A | 9/1995 | Izumi | |
| 5,459,610 A | 10/1995 | Bloom et al. | |
| 5,467,417 A | 11/1995 | Nakamura | |
| 5,515,184 A | 5/1996 | Caulfield | |
| 5,569,565 A | 10/1996 | Kawakami et al. | |
| 5,594,830 A | 1/1997 | Winston | |
| 5,638,084 A | 6/1997 | Kalt | |
| 5,650,865 A | 7/1997 | Smith | |
| 5,659,410 A | 8/1997 | Koike | |
| 5,703,667 A | 12/1997 | Ochiai | |
| 5,735,590 A | 4/1998 | Kashima | |

(Continued)

FOREIGN PATENT DOCUMENTS

CN  1272922  11/2000

(Continued)

OTHER PUBLICATIONS

Search Report—Austrian Patent Office, Jul. 14, 2005.

(Continued)

*Primary Examiner*—Ricky L Mack
*Assistant Examiner*—Brandi N Thomas
(74) *Attorney, Agent, or Firm*—Knobbe, Martens, Olson & Bear LLP

(57) ABSTRACT

In one embodiment of the invention, a display is provided and includes a plurality of interferometric display elements. The display further includes at least one diffuser. Optical properties of the diffuser are selected to reduce color shift of the display when viewed from at least one angle.

22 Claims, 13 Drawing Sheets

U.S. PATENT DOCUMENTS

| | | | |
|---|---|---|---|
| 5,770,626 A | 6/1998 | Shapiro et al. | |
| 5,771,321 A | 6/1998 | Stern | |
| 5,783,614 A | 7/1998 | Chen | |
| 5,793,504 A | 8/1998 | Stoll | |
| 5,810,464 A | 9/1998 | Ishikawa | |
| 5,815,229 A | 9/1998 | Shapiro et al. | |
| 5,854,872 A | 12/1998 | Tai | |
| 5,877,874 A | 3/1999 | Rosenberg | |
| 5,892,598 A | 4/1999 | Asakawa et al. | |
| 5,914,804 A | 6/1999 | Goossen et al. | |
| 5,933,183 A | 8/1999 | Enomoto | |
| 5,982,540 A | 11/1999 | Koike | |
| 5,991,073 A | 11/1999 | Woodgate et al. | |
| 6,014,192 A | 1/2000 | Lehureau | |
| 6,040,937 A | 3/2000 | Miles | |
| 6,048,071 A | 4/2000 | Sawayama | |
| 6,049,317 A | 4/2000 | Thompson et al. | |
| 6,055,090 A | 4/2000 | Miles | |
| 6,072,620 A | 6/2000 | Shiono | |
| 6,073,034 A | 6/2000 | Jacobsen | |
| 6,091,469 A | 7/2000 | Naito | |
| 6,195,196 B1 | 2/2001 | Kimura et al. | |
| 6,196,691 B1 | 3/2001 | Ochiai | |
| 6,211,976 B1 | 4/2001 | Popovich | |
| 6,232,937 B1 | 5/2001 | Jacobsen | |
| 6,243,149 B1 | 6/2001 | Swanson et al. | |
| 6,282,010 B1 | 8/2001 | Sulzbach et al. | |
| 6,356,378 B1 | 3/2002 | Huibers | |
| 6,381,022 B1 | 4/2002 | Zavracky et al. | |
| 6,412,969 B1 | 7/2002 | Torihara | |
| 6,493,475 B1 | 12/2002 | Lin | |
| 6,522,794 B1 | 2/2003 | Bischel et al. | |
| 6,538,813 B1 | 3/2003 | Magno et al. | |
| 6,574,033 B1 | 6/2003 | Chui | |
| 6,598,987 B1 | 7/2003 | Parikka | |
| 6,636,322 B1 | 10/2003 | Terashita | |
| 6,642,913 B1 | 11/2003 | Kimura | |
| 6,646,772 B1 | 11/2003 | Popvovich et al. | |
| 6,650,455 B2 | 11/2003 | Miles | |
| 6,653,616 B2 | 11/2003 | Chuang et al. | |
| 6,669,350 B2 | 12/2003 | Yamashita | |
| 6,674,562 B1 | 1/2004 | Miles | |
| 6,693,690 B2 | 2/2004 | Umemoto | |
| 6,709,123 B2 | 3/2004 | Flohr | |
| 6,738,194 B1 | 5/2004 | Ramirez et al. | |
| 6,742,921 B2 | 6/2004 | Umemoto | |
| 6,760,135 B1 | 7/2004 | Payne | |
| 6,773,126 B1 | 8/2004 | Hatjasalo et al. | |
| 6,774,962 B2 | 8/2004 | Yoon | |
| 6,794,119 B2 | 9/2004 | Miles | |
| 6,798,469 B2 | 9/2004 | Kimura | |
| 6,819,469 B1 | 11/2004 | Koba | |
| 6,822,745 B2 * | 11/2004 | De Groot et al. | 356/496 |
| 6,841,787 B2 | 1/2005 | Almogy | |
| 6,879,354 B1 | 4/2005 | Sawayama | |
| 6,885,377 B2 | 4/2005 | Lim | |
| 6,917,469 B2 | 7/2005 | Momose | |
| 6,940,653 B2 | 9/2005 | Favalora et al. | |
| 6,967,779 B2 | 11/2005 | Fadel et al. | |
| 6,970,031 B1 | 11/2005 | Martin | |
| 6,999,225 B2 | 2/2006 | Lin et al. | |
| 7,002,726 B2 | 2/2006 | Patel | |
| 7,009,754 B2 | 3/2006 | Huibers | |
| 7,018,088 B2 | 3/2006 | Yu | |
| 7,030,949 B2 | 4/2006 | Kashima | |
| 7,038,752 B2 | 5/2006 | Lin | |
| 7,042,643 B2 | 5/2006 | Miles | |
| 7,064,875 B2 * | 6/2006 | Kawano et al. | 359/11 |
| 7,072,093 B2 | 7/2006 | Piehl et al. | |
| 7,110,158 B2 | 9/2006 | Miles | |
| 7,113,339 B2 | 9/2006 | Taguchi et al. | |
| 7,123,216 B1 | 10/2006 | Miles | |
| 7,138,984 B1 | 11/2006 | Miles | |
| 7,142,347 B2 | 11/2006 | Islam | |
| 7,142,367 B2 | 11/2006 | Ikeda et al. | |
| 7,156,546 B2 | 1/2007 | Higashiyama | |
| 7,161,730 B2 | 1/2007 | Floyd | |
| 7,218,429 B2 | 5/2007 | Batchko | |
| 7,262,916 B2 | 8/2007 | Kao | |
| 7,336,329 B2 | 2/2008 | Yoon | |
| 7,359,011 B2 | 4/2008 | Hamada | |
| 7,369,294 B2 | 5/2008 | Gally | |
| 7,380,970 B2 | 6/2008 | Hwang | |
| 7,417,784 B2 | 8/2008 | Sasagawa | |
| 7,450,295 B2 | 11/2008 | Tung | |
| 7,508,571 B2 | 3/2009 | Gally | |
| 2001/0019380 A1 | 9/2001 | Ishihara | |
| 2001/0019479 A1 | 9/2001 | Nakabayashi et al. | |
| 2001/0030861 A1 | 10/2001 | Oda | |
| 2001/0049061 A1 | 12/2001 | Nakagaki et al. | |
| 2001/0055208 A1 | 12/2001 | Kimura | |
| 2002/0034071 A1 | 3/2002 | Mabuchi | |
| 2002/0054258 A1 | 5/2002 | Kondo | |
| 2002/0080465 A1 | 6/2002 | Han | |
| 2002/0105699 A1 | 8/2002 | Miracky et al. | |
| 2002/0126364 A1 | 9/2002 | Miles | |
| 2002/0135560 A1 | 9/2002 | Akaoka | |
| 2002/0149584 A1 | 10/2002 | Simpson | |
| 2002/0154256 A1 | 10/2002 | Takeshi et al. | |
| 2002/0172039 A1 | 11/2002 | Inditsky | |
| 2002/0180910 A1 | 12/2002 | Umemoto | |
| 2002/0180915 A1 | 12/2002 | Kashima | |
| 2003/0067760 A1 | 4/2003 | Jagt | |
| 2003/0083429 A1 | 5/2003 | Smith et al. | |
| 2003/0103177 A1 | 6/2003 | Maeda | |
| 2003/0151821 A1 | 8/2003 | Favalora et al. | |
| 2003/0160919 A1 | 8/2003 | Suzuki et al. | |
| 2003/0161040 A1 | 8/2003 | Ishii | |
| 2003/0184690 A1 | 10/2003 | Ogiwara | |
| 2003/0210363 A1 | 11/2003 | Yasukawa et al. | |
| 2004/0032401 A1 | 2/2004 | Nakazawa | |
| 2004/0051929 A1 | 3/2004 | Sampsell | |
| 2004/0125048 A1 | 7/2004 | Fukuda et al. | |
| 2004/0125281 A1 | 7/2004 | Lin et al. | |
| 2004/0174583 A1 | 9/2004 | Chen et al. | |
| 2004/0207995 A1 | 10/2004 | Park | |
| 2004/0233357 A1 | 11/2004 | Fujimori | |
| 2004/0246743 A1 | 12/2004 | Lee | |
| 2005/0002082 A1 | 1/2005 | Miles | |
| 2005/0010568 A1 | 1/2005 | Nagatomo | |
| 2005/0024557 A1 | 2/2005 | Lin | |
| 2005/0069254 A1 | 3/2005 | Schultheis | |
| 2005/0120553 A1 | 6/2005 | Brown | |
| 2005/0133761 A1 | 6/2005 | Thielemans | |
| 2005/0141065 A1 | 6/2005 | Masamoto | |
| 2005/0146897 A1 | 7/2005 | Mimura | |
| 2005/0179977 A1 * | 8/2005 | Chui et al. | 359/237 |
| 2005/0195468 A1 * | 9/2005 | Sampsell | 359/292 |
| 2005/0231977 A1 | 10/2005 | Hayakawa | |
| 2005/0259939 A1 | 11/2005 | Rinko | |
| 2005/0286113 A1 | 12/2005 | Miles | |
| 2006/0001942 A1 | 1/2006 | Chui | |
| 2006/0002141 A1 | 1/2006 | Ouderkirk | |
| 2006/0051048 A1 | 3/2006 | Gardiner et al. | |
| 2006/0066511 A1 | 3/2006 | Chui et al. | |
| 2006/0066586 A1 | 3/2006 | Gally et al. | |
| 2006/0066935 A1 | 3/2006 | Cummings et al. | |
| 2006/0067600 A1 | 3/2006 | Gally | |
| 2006/0077123 A1 | 4/2006 | Gally et al. | |
| 2006/0077154 A1 | 4/2006 | Gally | |
| 2006/0077514 A1 | 4/2006 | Sampsell | |
| 2006/0109682 A1 | 5/2006 | Ko et al. | |
| 2006/0126142 A1 | 6/2006 | Choi | |
| 2006/0132383 A1 | 6/2006 | Gally | |

| | | | |
|---|---|---|---|
| 2006/0181903 A1 | 8/2006 | Okuwaki |
| 2006/0198013 A1 | 9/2006 | Sampsell |
| 2006/0209012 A1 | 9/2006 | Hagood |
| 2006/0209385 A1 | 9/2006 | Liu et al. |
| 2006/0215958 A1 | 9/2006 | Yeo |
| 2006/0227532 A1 | 10/2006 | Ko et al. |
| 2006/0274400 A1 | 12/2006 | Miles |
| 2007/0196040 A1 | 8/2007 | Wang et al. |
| 2007/0201234 A1 | 8/2007 | Ottermann |
| 2008/0049450 A1 | 2/2008 | Sampsell |
| 2008/0112039 A1 | 5/2008 | Chui |
| 2008/0151347 A1 | 6/2008 | Chui |
| 2009/0097100 A1 | 4/2009 | Gally |
| 2009/0126792 A1 | 5/2009 | Gruhlke |

FOREIGN PATENT DOCUMENTS

| | | |
|---|---|---|
| CN | 1286424 | 3/2001 |
| DE | 3402746 A1 | 8/1985 |
| DE | 196 22 748 | 12/1997 |
| DE | 102 28 946 | 1/2004 |
| EP | 0 278 038 | 8/1988 |
| EP | 0 822 441 | 2/1998 |
| EP | 0 879 991 | 11/1998 |
| EP | 0 957 392 | 11/1999 |
| EP | 1 089 115 | 4/2001 |
| EP | 1 222 586 | 8/2001 |
| EP | 1 199 512 | 4/2002 |
| EP | 1 279 892 | 1/2003 |
| EP | 1 081 633 | 3/2003 |
| EP | 1 329 664 | 7/2003 |
| EP | 1 347 315 | 9/2003 |
| EP | 1 413 543 | 4/2004 |
| EP | 1 544 537 | 6/2005 |
| EP | 1 577 701 | 9/2005 |
| EP | 1 640 314 | 3/2006 |
| EP | 1 640 778 | 3/2006 |
| EP | 1 734 401 | 12/2006 |
| GB | 2 260 203 A | 4/1993 |
| GB | 2 278 222 | 11/1994 |
| GB | 2278222 | 11/1994 |
| JP | 62-009317 | 1/1987 |
| JP | 04-081816 | 3/1992 |
| JP | 05-281479 | 10/1993 |
| JP | 09 022012 | 1/1997 |
| JP | 09281917 A | 10/1997 |
| JP | 10 202948 | 4/1998 |
| JP | 11174234 A | 7/1999 |
| JP | 11 232919 | 8/1999 |
| JP | 2000 305074 | 11/2000 |
| JP | 2001305312 | 10/2001 |
| JP | 2001/343514 A | 12/2001 |
| JP | 2002-090549 | 3/2002 |
| JP | 2002-174780 | 6/2002 |
| JP | 2003-057652 | 2/2003 |
| JP | 2003 066451 | 3/2003 |
| JP | 2003 177336 | 6/2003 |
| JP | 2003-315694 | 11/2003 |
| WO | WO 95/01584 | 1/1995 |
| WO | WO 95/14256 A1 | 5/1995 |
| WO | WO 97/01240 | 1/1997 |
| WO | WO 97/16756 | 5/1997 |
| WO | WO 97/17628 | 5/1997 |
| WO | WO 98/32047 | 7/1998 |
| WO | WO 98/35182 | 8/1998 |
| WO | WO 99/63394 | 12/1999 |
| WO | WO 01/57434 | 8/2001 |
| WO | WO 02/06858 | 1/2002 |
| WO | WO 02/071132 A2 | 9/2002 |
| WO | WO 03/032058 | 4/2003 |
| WO | WO 03/038509 | 5/2003 |
| WO | WO 03/056876 | 7/2003 |
| WO | WO 03/062912 | 7/2003 |
| WO | WO 03/075207 | 9/2003 |
| WO | WO 2004/006003 | 1/2004 |
| WO | WO 2004/027514 | 4/2004 |
| WO | WO 2004/027514 A2 | 4/2004 |
| WO | WO 2004/036270 A1 | 4/2004 |
| WO | WO 2005/011012 | 2/2005 |
| WO | WO 2005/076051 | 8/2005 |
| WO | WO 2005/088367 | 9/2005 |
| WO | WO 2006/036440 | 4/2006 |
| WO | WO 2006/036588 | 4/2006 |
| WO | WO 2007/094558 | 8/2007 |
| WO | WO 2008/027275 | 3/2008 |
| WO | WO 2008/039229 | 4/2008 |
| WO | WO 2008/045200 | 4/2008 |
| WO | WO 2008/045207 | 4/2008 |
| WO | WO 2008/045224 | 4/2008 |
| WO | WO 2008/045311 | 4/2008 |
| WO | WO 2008/045462 | 4/2008 |
| WO | WO 2008/045463 | 4/2008 |
| WO | WO 2008/069877 | 6/2008 |

OTHER PUBLICATIONS

Mehregany et al., "MEMS Applications in Optical Systems", IEEE/LEOS 1996 Summer Topical Meetings, pp. 75-76, (Aug. 5-9, 1996).
Miles, et al., Digital Paper for reflective displays, Journal of the Society for Information Display, San Jose, CA, vol. 11, No. 1, 2003, pp. 209-215.
Office Action Mailed May 21, 2007 in U.S. Appl. No. 11/041,020.
Response to Office Action filed Aug. 21, 2007 for U.S. Appl. No. 11/041,020.
Office Action Mailed May 3, 2007 in U.S. Appl. No. 11/156,335.
Response to Office Action filed Aug. 2, 2007 for U.S. Appl. No. 11/156,335.
ISR for PCT/US2005/031238 filed Sep. 14, 2005.
European Search Report Mailed Jan. 25, 2006 in EPO App. No. 05255711.3-2217.
Office Action Mailed Oct. 12, 2006 in EPO App. No. 05255711.3-2217.
Obi, et al., "Fabrication of Optical MEMS in SOL-GEL Materials", 2002 IEEE/LEOS International Conference on Optical MEMS, Conference Digest, pp. 39 and 40, (Aug. 20-23, 2002).
Goossen, "MEMS-Based Variable Optical Interference Devices", 2000 IEEE/LEOS International Conference on Optical MEMS, pp. 17 and 18, (Aug. 21-24, 2000).
Office Action mailed Jan. 29, 2008 in U.S. Appl. No. 11/156,335.
Amendment mailed Apr. 28, 2008 in U.S. Appl. No. 11/156,335.
Office Action mailed Nov. 5, 2007 in U.S. Appl. No. 11/041,020.
Amendment mailed Jan. 7, 2008 in U.S. Appl. No. 11/041,020.
Advisory Action mailed Feb. 14, 2008 in U.S. Appl. No. 11/041,020.
Interview Summary mailed Mar. 28, 2008 in U.S. Appl. No. 11/041,020.
RCE and Amendment mailed Apr. 14, 2008 in U.S. Appl. No. 11/041,020.
Official Communication from PRC (China) Patent Office in PRC (China) Application No. 200510103554.5 mailed Mar. 28, 2008.
Official Communication from Mexican Patent Office in Mexican Application No. PA/a/2005/010243 mailed Apr. 21, 2008.
ISR and Written Opinion for PCT/US2007/018639 dated Mar. 20, 2008 (PCT Publication No. WO 2008/027275).
Partial International Search Report for PCT/US2007/021623 dated May 13, 2008 (PCT Publication No. WO 2008/045463).
Partial International Search Report for PCT/US2007/021622 dated May 13, 2008 (PCT Publication No. WO 2008/045462).
Austrian Search Report for U.S. Appl. No. 11/041,020 (Publication No. 2006/077514).
Austrian Search Report for U.S. Appl. No. 11/036,965 (Publication No. 2005/0179977).
ISR and Written Opinion for PCT/US2005/002986 filed Feb. 2, 2005 (PCT Publication No. WO 2005/076051).
ISR and Written Opinion for PCT/US2005/033056 filed Sep. 14, 2005 (PCT Publication No. WO 2005/036588).

ISR and Written Opinion for PCT/US2005/030968 filed Aug. 31, 2005 (PCT Publication No. WO 2006/036440).
Extended European Search Report in European Application No. 05255647.9 mailed Mar. 12, 2008 (European Publication EP 1 640314).
Partial International Search Report for PCT/US2007/020736 dated Apr. 28, 2008 (PCT Publication No. WO 2008/045207).
Partial International Search Report for PCT/US2007/021376 dated Mar. 27, 2008 (PCT Publication No. WO 2008/045311).
Invitation to pay additiional fees and Partial International Search Report in PCT/US2009/033701 dated Jun. 4, 2009.
RCE and IDS in U.S. Appl. No. 11/041,020 dated Apr. 7, 2009.
Official Communication in U.S. Appl. No. 11/041,020 dated Jul. 11, 2008.
Response in U.S. Appl. No. 11/041,020 dated Oct. 10, 2008.
Notice of Allowance in U.S. Appl. No. 11/041,020 dated Jan. 8, 2008.
RCE in U.S. Appl. No. 11/041,020 dated Apr. 7, 2008.
Official Communication in Chinese App. No. 200510103554.5 dated Dec. 19, 2008.
Official Communication in Chinese App. No. 200510105063.4 dated May 30, 2008.
Office Action Japanese App. No. 2005-226115 mailed May 12, 2009.
Notice of Allowance in U.S. Appl. No. 11/041,020 dated Jun. 16, 2009.
Neal T.D., et. al., "Surface Plasmon enhanced emission from dye doped polymer layers," Optics Express Opt. Soc. America, USA, vol. 13, No. 14, Jul. 11, 2005.
International Search Report and Written Opinion in PCT/US2007/021376 (International Publication No. WO 2008/045311) dated Jun. 18, 2008.
International Search Report and Written Opinion in PCT/US2007/020999 (International Publication No. WO 2008/045244) dated Mar. 20, 2008.
International Search Report and Written Opinion in PCT/US2007/021623 (International Publication No. WO 2008/045463) dated Oct. 22, 2008.
International Search Report and Written Opinion in PCT/US2007/021622 (International Publication No. WO 2008/045462) dated Oct. 22, 2008.
ISR and WO dated Jul. 14, 2008 in International Application No. PCT/US2007/020736 (International Publication No. WO 2008/045207).
WO dated Apr. 3, 2008 in International Patent Application No. PCT/US07/04277 (International Publication No. WO 2008/039229).
International Search Report and Written Opinion in PCT/US2007/020680 (International Publication No. WO 2008/045200) dated Jul. 1, 2008.
International Search Report and Written Opinion in PCT/US2008/069877 (International Publication No. WO 2008/069877) dated Aug. 14, 2008.
Official Communication in European App. No. 05255647.9 dated Feb. 27, 2009.
Office Action in Japanese App. No. 2005-226115 dated May 12, 2009.
International Search Report and Written Opinion in PCT/US2008/085026 dated Apr. 20, 2009.
Extended Search Report in European App. No. 08153686.4 dated Apr. 17, 2009.
Partial International Search Report and invitation to pay fees in PCT/US2009/033698 dated May 29, 2009.
Extended European Search Report in European App. No. 05255711.3 (European Publication No.: EP 1 640 778) dated Jan. 25, 2006.

* cited by examiner

METHOD AND DEVICE FOR COMPENSATING FOR COLOR SHIFT AS A FUNCTION OF ANGLE OF VIEW

CROSS-REFERENCE TO RELATED APPLICATIONS

This application claims priority to U.S. Provisional Application No. 60/613,978, filed on Sep. 27, 2004.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

Another embodiment is a display that includes at least one interferometric modulator configured to reflect incident light. The at least one interferometric modulator has an optical response that depends at least in part on angle of view and wavelength of the incident light. The display further includes a diffuser positioned in an optical path to the at least one interferometric modulator. The diffuser has an optical response that is substantially matched to the optical response of the interferometric modulator to maintain substantially the composition of color at different angles of view.

Another embodiment is a display. The display includes at least one interferometric modulator having a spectral responsivity that varies with angle of view, $\theta$, such that color varies with angle of view. The display further includes a non-lambertian diffuser positioned in an optical path to the at least one interferometric modulator. The non-lambertian diffuser has an optical response that varies with angle of view. The diffuser substantially reduces variation of color with angle of view.

Another embodiment is a method of fabricating a display. The method includes selecting a diffuser having an optical response. The method further includes disposing the diffuser in front of an interferometric modulator array. The interferometric modulator array has an optical response that depends on angle of view. Selecting the diffuser includes substantially matching the optical response of the diffuser and the optical response of the interferometric modulator array to reduce angular color shift with angle-of-view of the display. One embodiment is a display manufactured according to this method.

Another embodiment is a method of tailoring optical properties of a display. The display includes an interferometric modulator having a spectral responsivity and a diffuser having an optical response. The method includes selecting at least one property of the diffuser with reference to the spectral responsivity of the interferometric modulator so as to reduce color shift of the display.

Another embodiment is a display system for producing an image. The system includes at least one interferometric modulator having a spectral responsivity that depends at least in part on angle of view of the display. The system further includes a diffuser positioned in at least one optical path through the at least one interferometric modulator. The interferometric modulator is configured to at least partially encrypt the image from view. The diffuser is configured to decrypt the image.

One embodiment is a method of limiting view of a display to authorized viewers. The method includes selecting at least one interferometric modulator having a spectral responsivity that depends at least in part on angle of view of the display. The method further includes reflecting light indicative of an image from the at least one interferometric modulator. The interferometric modulator is configured to at least partially obscure the image from view. The method further comprises diffusing the reflected light from the at least one interferometric modulator with a diffuser having an optical response, wherein the optical response of the diffuser is configured to so as to decrypt the image.

In other embodiments, other types of spatial light modulators may be used, particularly those exhibiting color shift as function of viewing position.

DETAILED DESCRIPTION OF THE CERTAIN EMBODIMENTS

Various embodiments of the invention describe a system and method of using a diffuser with interferometric modulator devices so as to mitigate or compensate for color shift as a function of angle of view. In one embodiment of the invention, the display includes a plurality of interferometric display elements exhibiting color shift. The display further includes at least one diffuser. Optical properties of the diffuser are selected to reduce color shift of the display for at least one range of angles.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
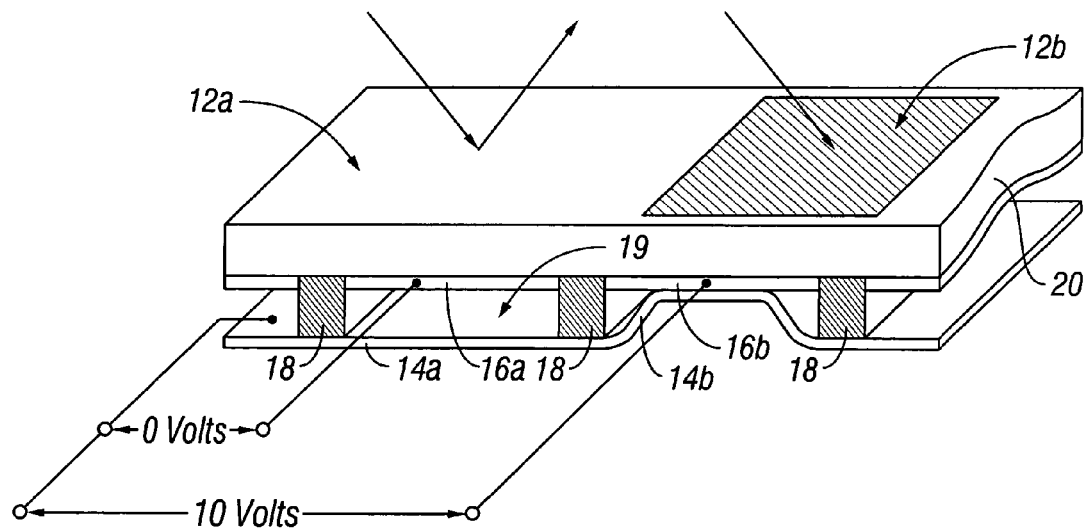
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
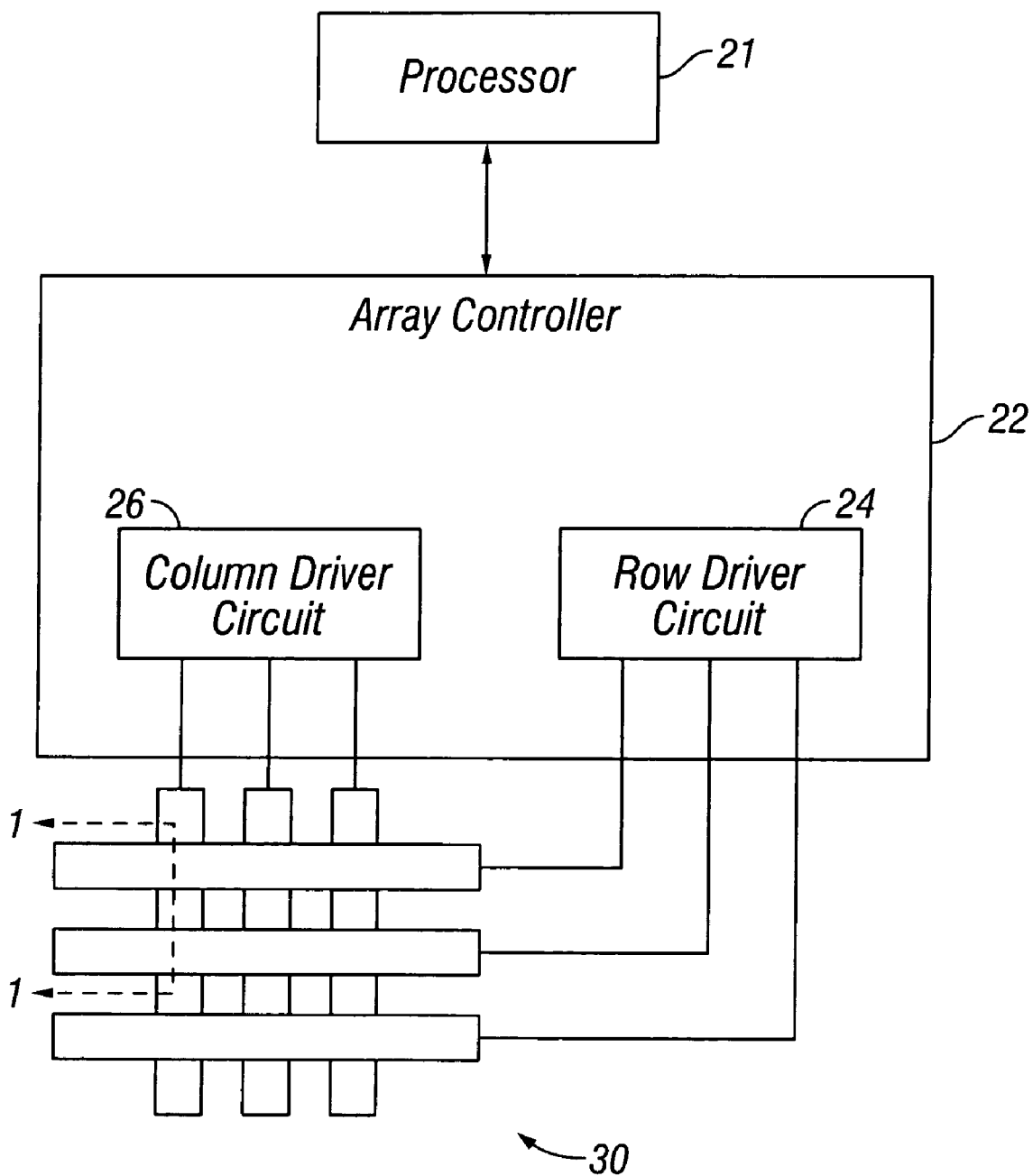
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
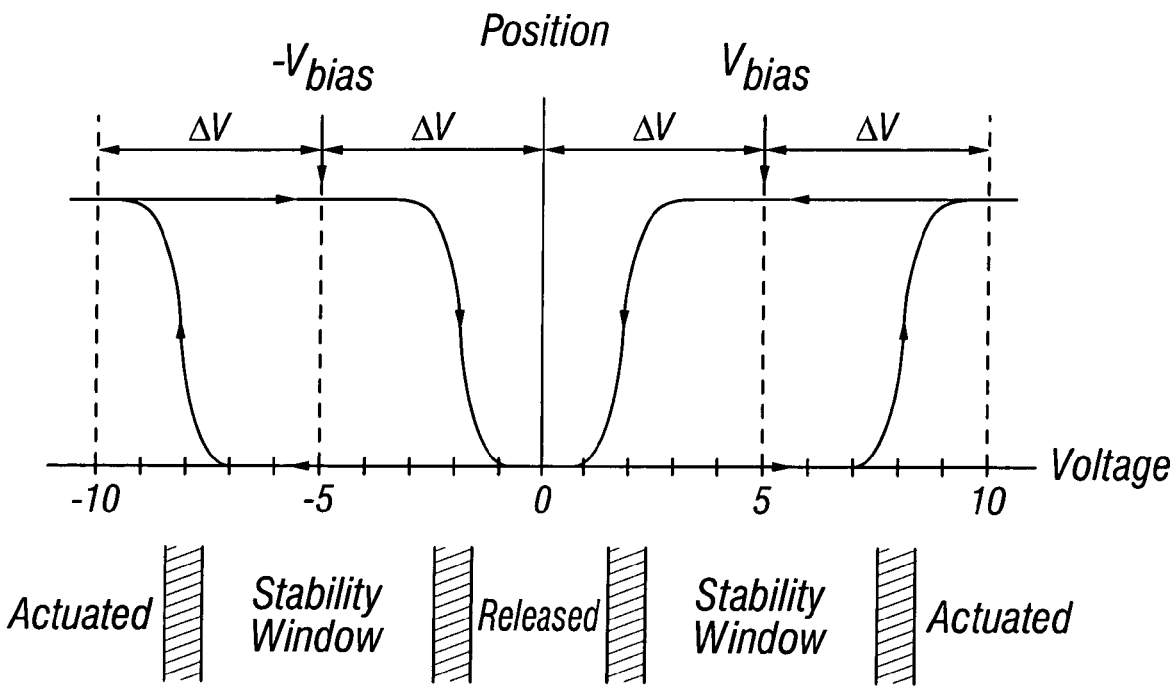
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
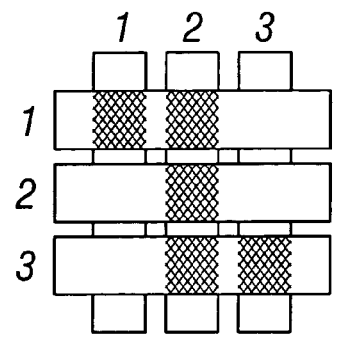
FIGS. 5A and 5B illustrate one exemplary timing diagram for row and column signals that may be used to write a frame of display data to the 3×3 interferometric modulator display of FIG. 2.
Figure 5B:
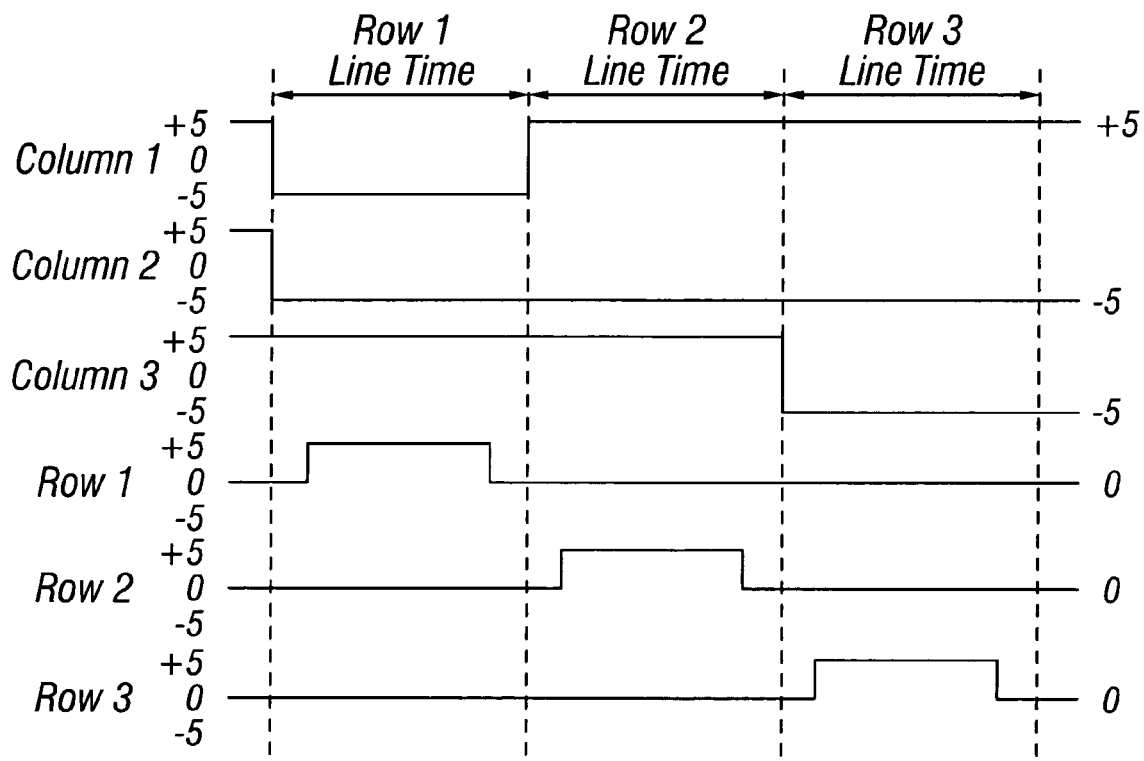

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
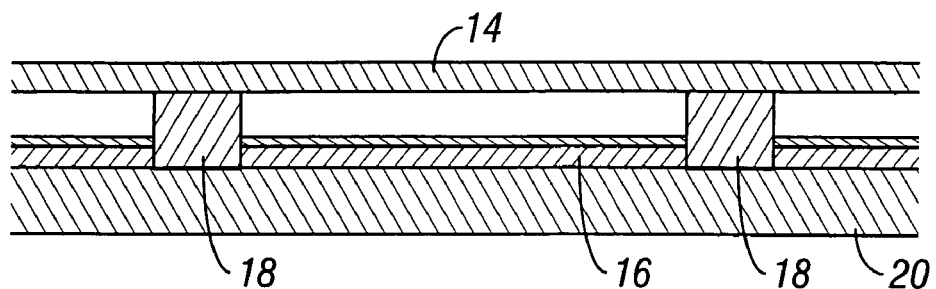
FIG. 6A is a cross section of the device of FIG. 1.
Figure 6B:
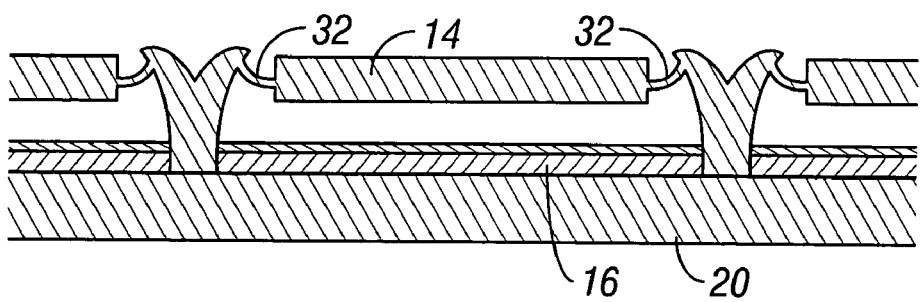
FIG. 6B is a cross section of an alternative embodiment of an interferometric modulator.
Figure 6C:
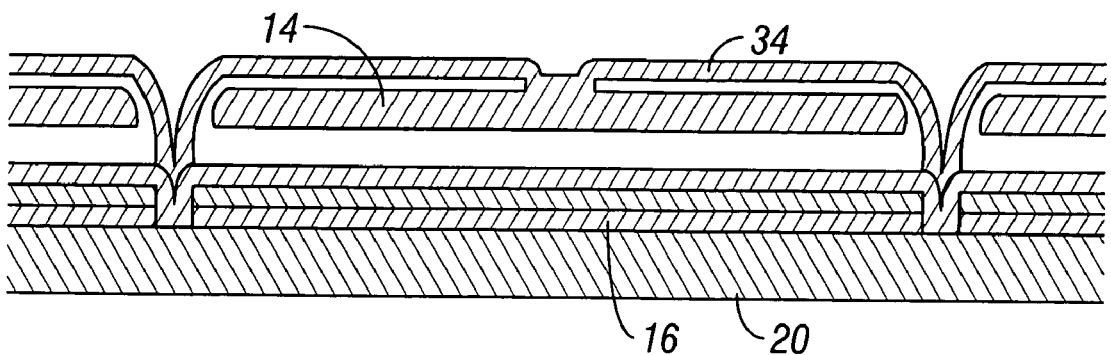
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Figure 7:
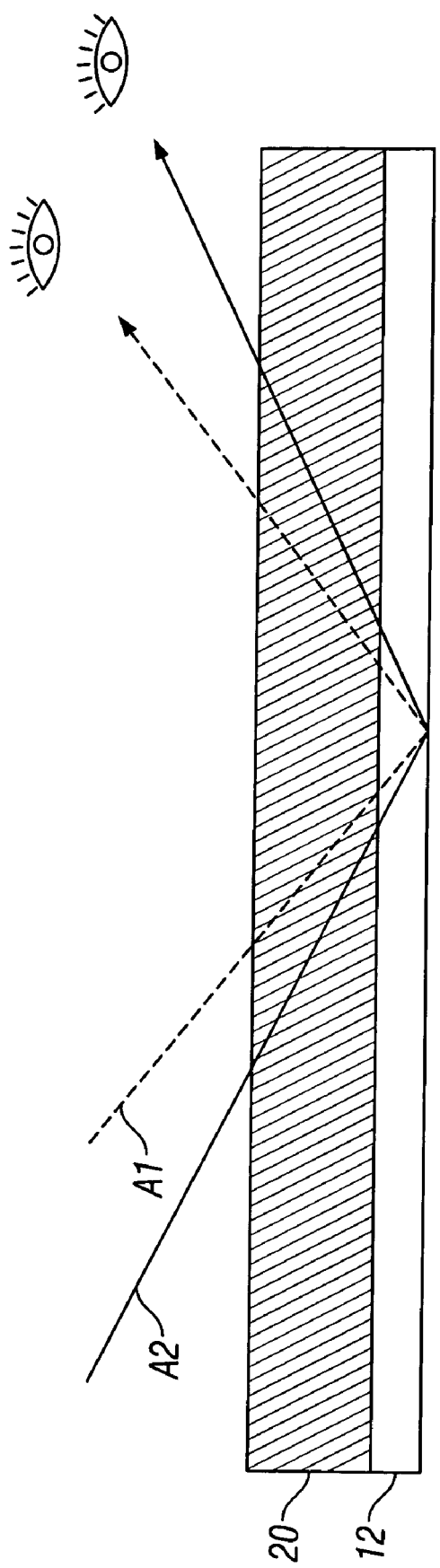
FIG. 7 is a side cross-sectional view of an interferometric modulator display illustrating optical paths through the modulator.

FIG. 7 is a side cross-sectional view of an interferometric modulator 12 illustrating optical paths through the modulator 12. The color of light reflected from the interferometric modulator 12 may vary for different angles of incidence (and reflection) as illustrated in FIG. 7. For example, for the interferometric modulator 12 shown in FIG. 7, as light travels along path $A_1$, the light is incident on the interferometric modulator at a first angle, reflects from the interferometric modulator, and travels to a viewer. The viewer perceives a first color when the light reaches the viewer as a result of optical interference between a pair of mirrors in the interferometric modulator 12. When the viewer moves or changes his/her location and thus view angle, the light received by the viewer travels along a different path $A_2$ having corresponding a second different angle of incident (and reflection). Optical interference in the interferometric modulator 12 depends on optical path length of light propagated within the modulator. Different optical path lengths for the different optical paths $A_1$ and $A_2$ therefore yield different outputs from the interferometric modulator 12. The user therefore perceives different colors depending on his or her angle of view. This phenomenon is referred to as a "color shift".

The amount of color shift may be expressed in terms of a difference in wavelength, e.g., in nanometers, for the light emitted from the interferometric modulators for different angles of incident (and reflected light). As is well known, for spectral reflection, the angle of incidence is equal to the angle of reflection. The wavelength used to measure the color shift may be the peak wavelength of the specular distribution of light output from the interferometric modulator. As used herein, specular distribution refers to the wavelength distribution, such as for example, the intensity of light at different wavelengths.

Figure 8:
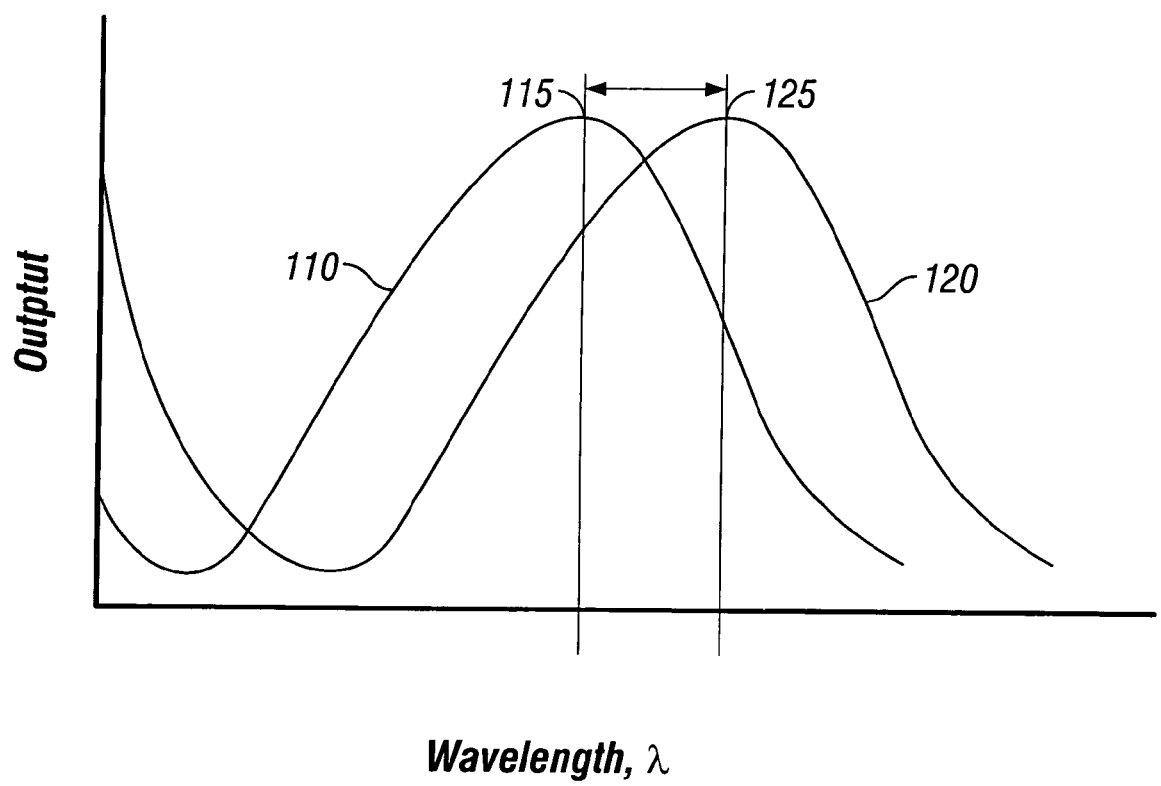
FIG. 8 schematically illustrates exemplary spectral responses R ($\theta_i$, $\lambda$) for different angles of incidence.

The output of the interferometric modulator 12 may be characterized by a spectral responsivity function or spectral response $R(\theta_i, \lambda)$, where $\theta_i$ is the angle of incidence of light and $\lambda$ is the wavelength. As described above, the spectral output of the interferometric modulator 12 varies with angle of incidence (and angle of reflection). FIG. 8 schematically illustrates exemplary spectral responses $R(\theta_i, \lambda)$ for different angles of incidence. A first plot 110, for example, shows a spectral response (output versus wavelength) for a first angle of incidence. A second plot 120 shows a spectral response for a second angle of incidence. The first and second plots each have peaks 115, 125, sometimes referred to herein as spectral lines. These plots 110, 120 and the corresponding peaks are shifted from each other. The shift in the peaks 115, 125 for the different plots shows the color shift with angle of view.

Generally, a certain amount of perceived off-axis color shift in a display may be tolerated for certain displays. A color shift or a change, e.g., of about 5-30 nanometers in wavelength for an angle of view shift of about 40° may be acceptable for certain applications. However, in some cases, the color shift is too significant and is noticeable by the observer. In such a case, methods of correcting or compensating for such intolerable color shifts as described herein may be employed. In practice, the level of tolerance that is permissible may depend upon factors that include the intended use of the display, the quality, and/or the price range of the display. As indicated above, the level of "tolerance" in color shift may be expressed in terms of nanometers of wavelength shift for a change in view angle of a specified range. For example, in one embodiment, the tolerance may be expressed for a range between about −60° and 60°. In another embodiment, for example, a display used as part of signage, the tolerance may be expressed for a range between about −80° and 80°.

Figure 9:
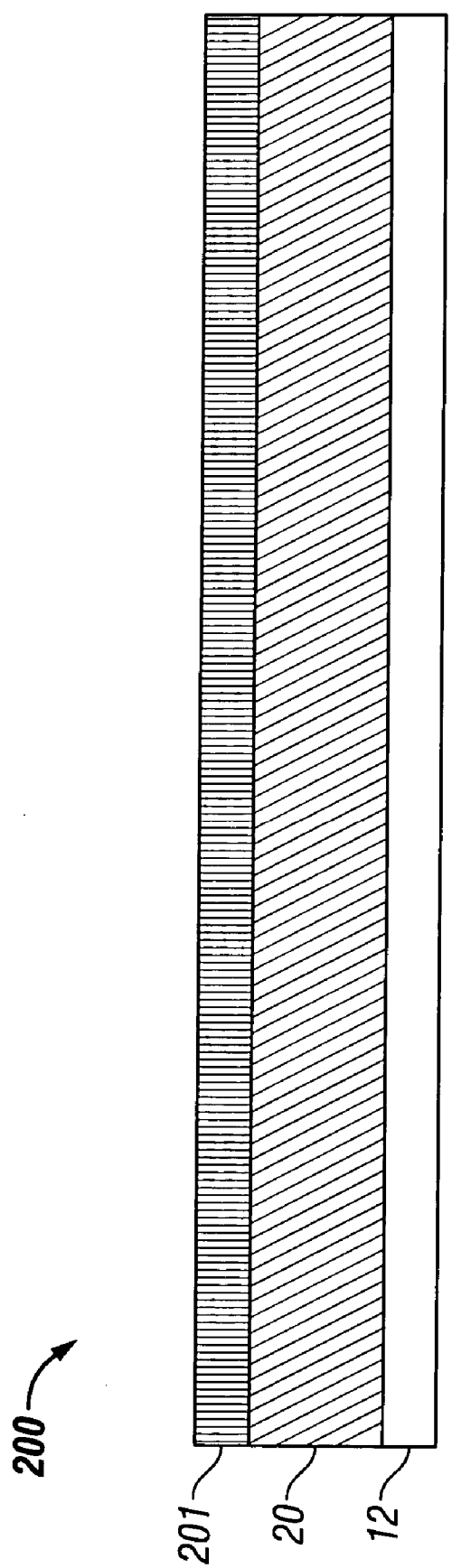
FIG. 9 is a side cross-sectional view of an interferometric modulator display that includes a diffuser.

In certain preferred embodiments, a diffuser may be used to compensate for the color shift of an interferometric modulator structure. FIG. 9 shows one embodiment of interferometric modulator display 200 that includes a diffuser layer 201. The interferometric modulator display 200 includes a transparent substrate 20, such as glass, having a viewing surface to which the diffuser layer 201 is attached. In one embodiment, for example, the diffuser layer 201 is formed on the top side of the substrate 20 as shown in FIG. 9. Other designs are also possible.

Diffusers may comprise bulk diffuser material. For example, a diffuser may include one or more layers of a material such as a suitable transparent or translucent polymer resin, for example, polyester, polycarbonate, polyvinyl chloride (PVC), polyvinylidene chloride, polystyrene, polyacrylates, polyethylene terephthalate, polyurethane, and copolymers or blends thereof. Other materials may be employed as well. In one embodiment, the diffuser is attached to a surface of the substrate using a double-sided adhesive.

Figure 10:
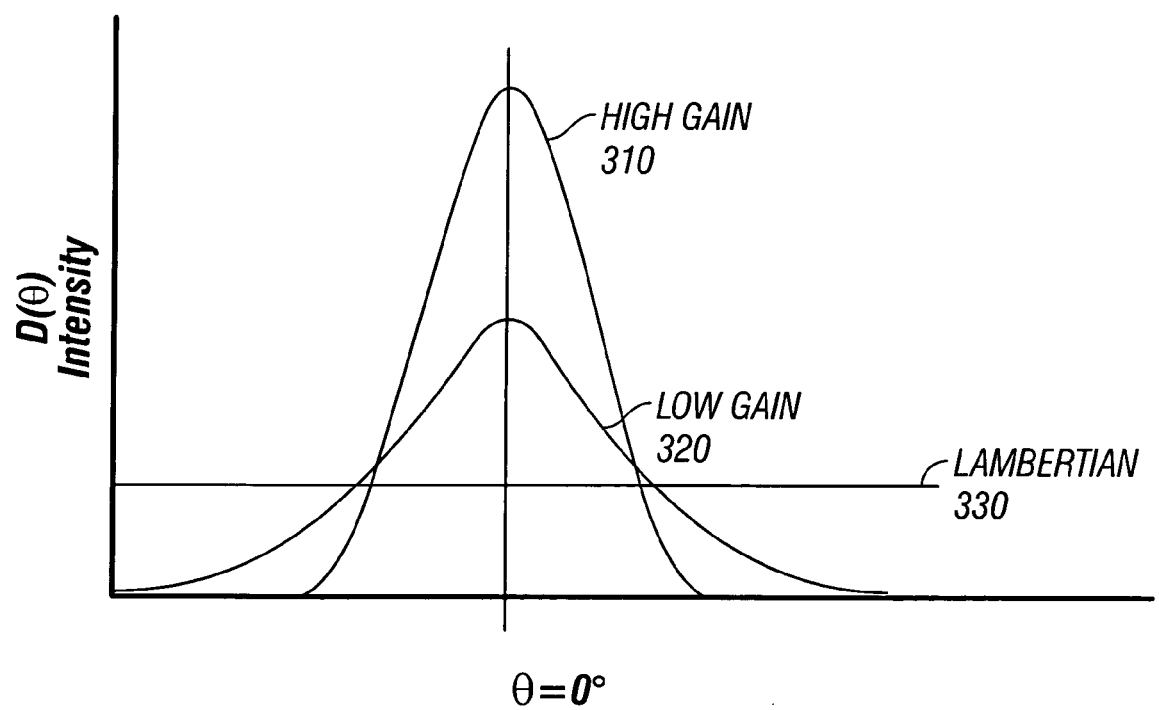
FIG. 10 is an exemplary graphical diagram of intensity versus view angle for various diffusers.

FIG. 10 is a graphical diagram 300 of exemplary optical responses, referred to as $D(\theta_i, \theta)$, for a diffuser or diffuser material in accordance embodiments of the invention. Output from the diffuser may depend on both angle of incidence $\theta_i$ and on angle of transmission or angle of view, $\theta$. Accordingly, the optical transfer function $D(\theta_i, \theta)$ may be expressed as a function of the angle of view "$\theta$" and the angle of incidence of light "$\theta_i$" ranging, e.g., from 0 to 90° or from 0 to −90°.

As shown in FIG. 10, the vertical axis depicts the relative intensity of light from a light source that is observed through a diffuser. The horizontal axis represents the angle of viewing of light communicated through the diffuser. The possible angle of view varies from 0 to 90 degrees on the right side of graph and from 0 to −90 degrees—left side of graph 300).

Curves or traces 310, 320, and 330 in FIG. 10 depict the optical response of diffusers for a given angle of incidence, $\theta_i$ as the output varies with transmission angle or view angle $\theta$. This angle of incidence may, for example, be 0° for the plots 310, 320, 330 in FIG. 10. The plots 310, 320, 330 in FIG. 10 show how much light is output from the diffuser in different directions corresponding to different angles of view, $\theta$. For example, $D(\theta_i, 0°)$ corresponds to the value of $\theta=0°$ in FIG. 10.

As further shown in FIG. 10, the first trace 310 depicts the perceived intensity of light versus angle of viewing for a particular diffuser (and a particular angle of incidence). In one embodiment, the trace 310 has a generally a bell-shaped curve that has a relatively sharp peak at a center angle. The sharp or relatively narrow peak is located at 0° for this embodiment of the diffuser. This narrow peak may for example have a width as measured at full width half maximum of about 10-30°. This type of trace is sometimes referred to as a high gain curve.

The trace 320 depicts an optical response for a second type of diffuser. The trace 320 is a generally bell-shaped curve that has a relatively small wider peak at its center. This narrow peak may for example have a width as measured at full width half maximum of about 60-100° The trace 320, with its relatively low peak and thus somewhat flattened response profile is sometimes referred to as a low gain curve. As shown in connection with the traces 310 and 320, each optical response is shown as centered at about 0° for the purpose of illustration. As will be discussed further below, the optical response may be centered at other angles for different diffusers.

Finally, FIG. 10 shows a trace 330 depicting the optical response of an ideal Lambertian diffuser. Lambertian diffusers are characterized by a substantially flat angular response profile. Thus, the trace 330 depicts an approximately straight line response having a generally fixed intensity at all angles of viewing. Conversely, non-lambertian diffusers do not have substantially flat angular response profiles. The high gain and low gain diffusers corresponding to traces 310 and 320 are examples of non-lambertian diffusers.

As discussed above, the traces 310 and 320 illustrate optical responses of various diffusers having responses that are centered around zero degrees (0°). In other embodiments, similar shaped (or other shaped) response profiles may be centered on view angles other than zero degrees, such as, for example, at ten (10), twenty (20), thirty (30), forty (40), 45 (forty five), 50 (fifty), 60 (sixty), 70 (seventy), 80 (eighty) degrees, or on any other view angle.

Figure 11:
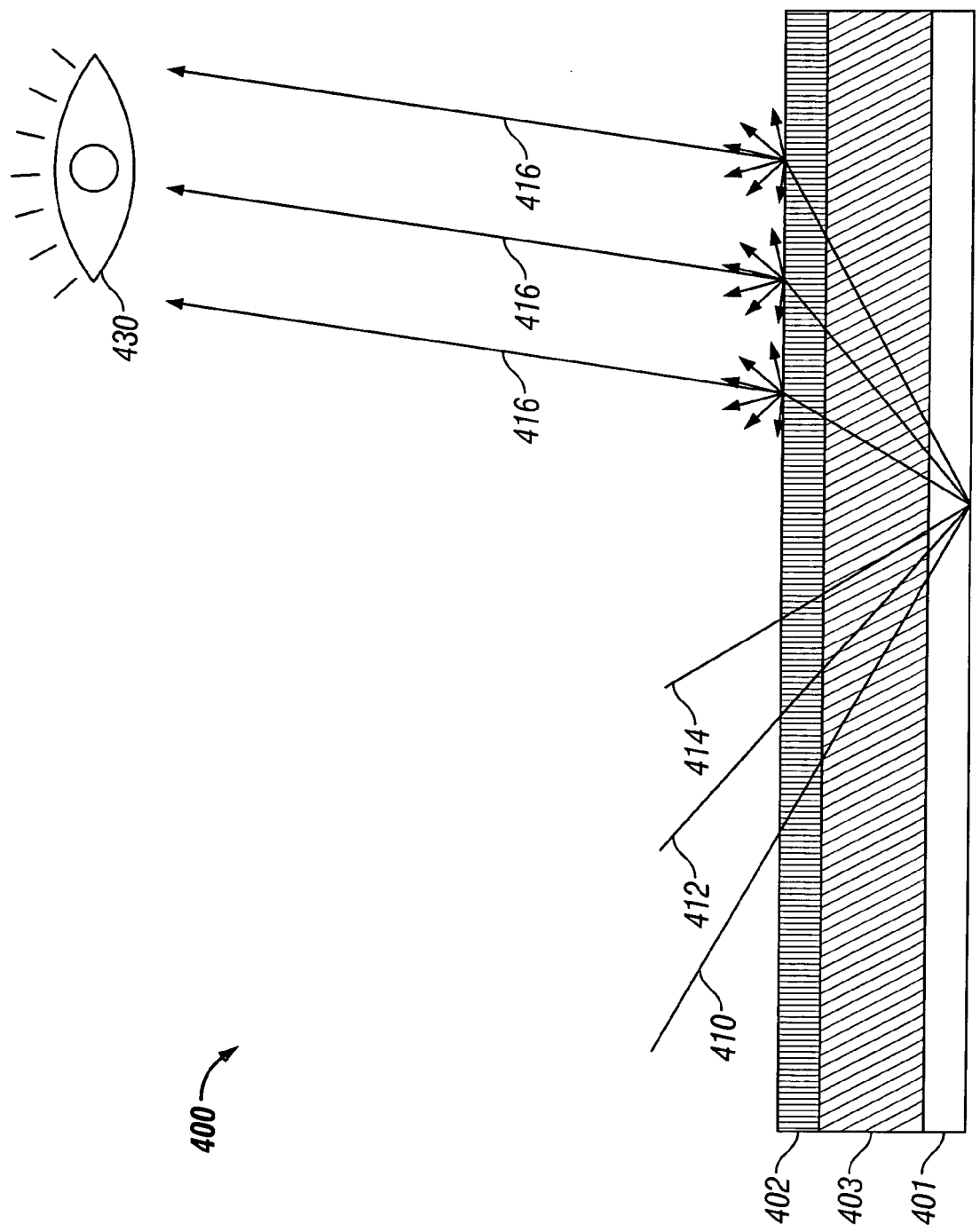
FIG. 11 is a cross-sectional view of the interferometric modulator display of FIG. 9, also showing an example of the effect of the diffuser.

Accordingly, $D(\theta_i, \theta)$ may be characterized by a response profile that may be different characteristically for different angles of view. In various embodiments, for example, the diffuser 201 may be a high gain, low gain (or very low gain), or any other suitable type of diffuser therebetween, or any combination thereof. As will be apparent from the following discussion, the centering of $D(\theta_i, \theta)$ around a particular angle is relevant to computing a convolution of $D(\theta_i, \theta)$ and optical response of the interferometric modulator, without the diffuser, which is referred to as $R(\theta_i, \lambda)$ FIG. 11 is a cross-sectional view illustrating an embodiment of an interferometric modulator display 400 that includes a diffuser 402. In one embodiment, the display 400 includes an array of interferometric modulators 401. In certain embodiments, the diffuser 402 is physically coupled to a substrate 403. Light is reflected in the interferometric modulator 401 so as to pass outward through the diffuser 402. As described in further detail below, the diffuser 402 is selected based on its characteristics which influence the reflected light so as to compensate for at least a portion of the angular color shift of the interferometric modulator 401. This compensation reduces the perceived color shift as the viewing angle of a user of the modulator 401 changes. In operation, light from the light source (not shown) is incident on the modulator 401 long optical paths such as exemplary paths 410, 412, and 414. Light on the exemplary optical paths 410, 412, and 414 is incident at angles of, e.g., 20, 30, and 40 degrees. It is to be recognized that any numerical values used herein, such as the angles of incidence of light paths 410, 412, and 414, are presented for purposes of illustration and are not necessarily indicative of any embodiment.

The modulator 401 reflects the light further along the paths 410, 412, and 414. The light along the paths 410, 412, and 414 is then incident on the diffuser 402. The diffuser 402 redirects portions of the reflected light along a range of optical paths at intensities that depend upon the gain characteristics, $D(\theta_i, \theta)$, of the diffuser 402. The diffused portion of the light from optical paths 410, 412, and 414, travels to a viewing position along optical paths 416. These paths 416 are at substantially the same angle with respect to the diffuser 402 and substantially parallel for this particular exemplary viewing position 430 which is a distant viewing position.

The diffuser 402 thus operates to collect light that is incident on the modulator 401 at a range of angles and corresponding optical paths, including the paths 410, 412, and 414. This collected light is redirected. A portion of this light is redirected to the viewing position along the optical paths 416.

The diffuser 402 thus collects light from the modulator 401 (or array of modulators 401) at a range of wavelengths to produce a net optical response for the modulator 401 as modified by the diffuser 402. The net optical response is related to the convolution of the optical response $D(\theta_i, \theta)$ of the diffuser with the optical response $R(\theta_i, \lambda)$ of the modulator 401 over a range of angles of light incident on the display 400.

By controlling the characteristics, e.g., $D(\theta_i, \theta)$, of the diffuser 402 in conjunction with optical response of the modulator 401, the net optical response of the system 400 can thus be controlled to achieve a desired net optical response. In one embodiment, the characteristics of the diffuser 402 and the interferometric modulator 401 are selected so as to substantially compensate for angular color shift of the interferometric modulator 401. In another embodiment, the characteristics of the diffuser 402 and the modulator 401 are selected so that an image formed by the modulator array alone is obscured or encrypted and is not visible. The image formed by the modulator array, however, is visible by viewing through the diffuser 402.

The overall optical characteristics of the modulator 401 together with the diffuser 402 may be modeled in terms of the convolution of the optical response (i.e., spectral reflectance or transfer function) of the modulator 401, with the optical response of the diffuser 402. An exemplary expression for this convolution is set forth below.

As noted above, the optical response $R(\theta_i, \lambda)$ of the modulator 401 is represented as a function of the angle of incidence, $\theta_i$, and wavelength of light, $\lambda$, entering the modulator 401. As the angle of incidence is equal to the angle of reflection for specular reflection, the view angle, $\theta$, for the modulator is equal to the angle of incidence, $\theta_i$, on the modulator. Hence, $R(\theta_i, \lambda)$ characterizes the optical response of the modulator as a function of view angle, $\theta$.

The intensity of the light coming out of the diffuser 402 is also generally a function of the viewing angle $\theta$ (and angle of incidence $\theta_i$). Accordingly, as described above, the optical response of the diffuser is characterized by $D(\theta_i, \theta)$.

For the combination of the modulator 401 and the diffuser 402, the view angle, $\theta$, of the modulator corresponds to the angle of incidence, $\theta_i$, of the diffuser. Thus, the total or net optical response of the modulator 401 as modified by the diffuser 402 (see FIG. 11) may be expressed as $R'(\theta, \lambda)$ in accordance with the following relation:

$$R'(\theta, \lambda) = \sum_{\theta_i} D(\theta_i, \theta) R(\theta_i, \lambda)$$

Using the above equation, the modified spectral reflectance $R'(\theta, \lambda)$ that includes the effects of the diffuser 402 can be computed. The summation is performed for a range of angles $\theta_i$ (i.e., for $\theta_i$=0 to 90 degrees) in determining the responsivity $R'(\theta, \lambda)$. The result is spectral response of the display for a given view angle $\theta$.

The spectral response of the combination of the modulator 401 and the diffuser 402 can thus be computed for a particular viewing angle and corresponding viewer position. Similarly, the spectral response for the aggregate structure comprising the modulator 401 and the diffuser 402 may be computed for multiple viewing angles and view positions to quantify color shift resulting from change in angle of view.

In one embodiment, it is desirable to define the type of overall or corrected reflectance (i.e., $R'(\theta, \lambda)$) in terms of particular criteria, e.g., acceptable or unacceptable level of color shift. For example, if the color shift at a particular angle of view (e.g., 30 degrees) is 100 nanometers, it may be desirable to reduce such color shift to no more than 20 nanometers. In such a case, the uncompensated optical response R ($\theta_i$, $\lambda$) of the modulator 401 having an undesirable 100-nanometer color shift (e.g., at 30 degrees) may be improved with a suitable diffuser so as to provide a resultant spectral response R'($\theta$, $\lambda$)) having an acceptable 20-nanometer color shift. It is worth noting that these numbers are chosen arbitrarily for illustrative purpose, and any tolerance level in color shift may be used in practice. For instance in certain embodiments, the level of tolerance in color shift characteristics may depend on intended use or planned viewing conditions.

Accordingly, the desirable optical response R'($\theta$, $\lambda$) is derivable from the uncompensated optical response R ($\theta_i$, $\lambda$). In this case, since the optical response of uncompensated R ($\theta_i$, $\lambda$) and desired R'($\theta$, $\lambda$) are known functions, the optical response (i.e., characteristics) for D($\theta_i$, $\theta$) can be computed from the above equation. Since the above equation has only one unknown variable, D($\theta_i$, $\theta$) can be determined to define the suitable diffuser for providing the desired spectral responsivity R'($\theta$, $\lambda$). The D($\theta_i$, $\theta$), once solved may, for example, correspond to a diffuser having a high gain, a low gain, or a very low gain response, or other suitable characteristics.

In one embodiment, D($\theta_i$, $\theta$) is determined by solving permutations of the equation above (e.g., solving the deconvolution). Well known mathematical and numerical methods may be employed to perform the calculations.

As is well known in the art, diffusers may be fabricated to provide a desired optical response. Accordingly, once characteristics of D ($\theta_i$, $\theta$) are determined, a suitable physical configuration and material of the diffuser 402 may then be determined to produce at least an approximation of the desired response profile D ($\theta_i$, $\theta$) such that the color shift is within a desired tolerance at the target angle. In various embodiments, the physical configuration may be determined using techniques such as are known in the art. Diffusers with selected properties are available, for example, from Nitto Denko, Osaka, Japan. Additional details regarding selecting a diffuser based on the spectral response of the interferometric modulator are discussed more fully below.

To illustrate application of this optical model, calculations for determining the spectral response R'($\theta$, $\lambda$) of the combination of the modulator 401 and diffuser 402 based on the known spectral response R ($\theta_i$, $\lambda$) of the modulator 401 and the known optical response D ($\theta_i$, $\theta$) of the diffuser are provided.

Figure 12A:
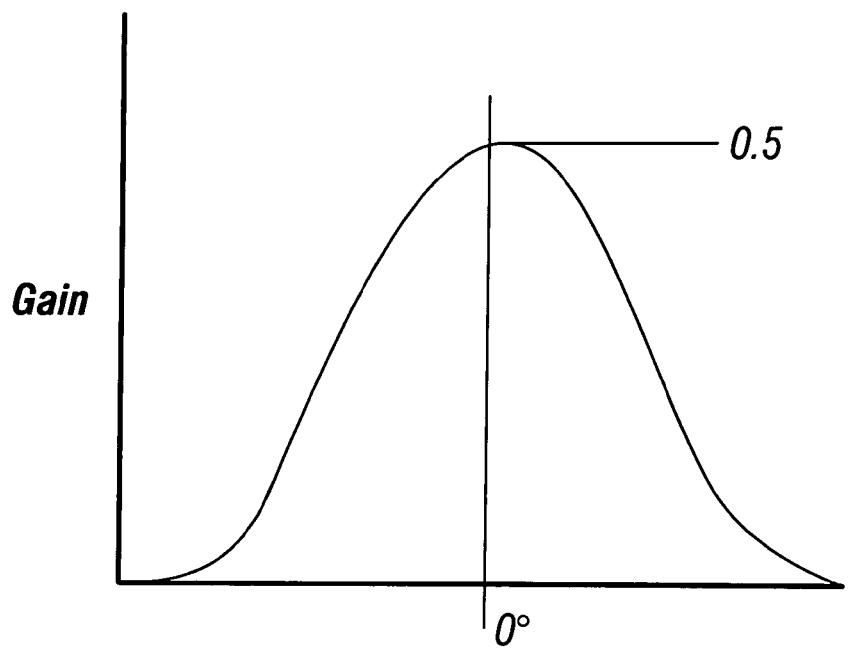
FIGS. 12A and 12B are graphical diagrams illustrating the gain of an exemplary diffuser versus angle of view for light incident at two different angles.
Figure 12B:
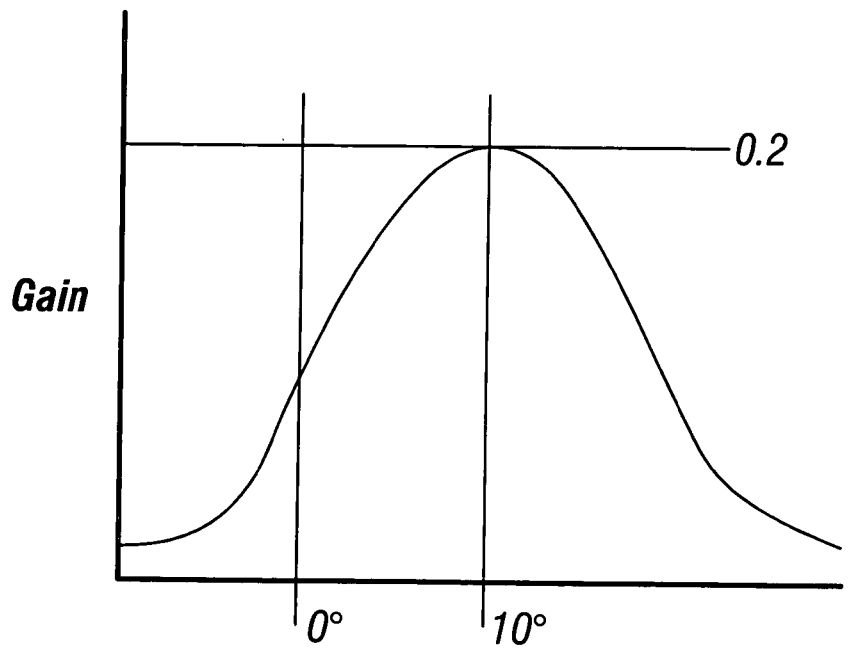

In one embodiment, for example, the diffuser 402 is a diffuser having high gain characteristics that may be selected to reduce or compensate for the color shift. FIG. 12A is a graphical diagram illustrating the gain of the exemplary diffuser 402 versus angle of view for an angle of incidence of 0°. FIG. 12B is a graphical diagram illustrating the gain of the exemplary diffuser 402 versus angle of view at an angle of incidence of 10°. In this illustration, it may be assumed that the following values for R ($\theta_i$, $\lambda$) are derived from the curve of the optical response (not shown):

$$R(0°, \lambda) = \begin{bmatrix} 0.5 \\ 0.9 \end{bmatrix} \text{ and}$$

$$R(10°, \lambda) = \begin{bmatrix} 0.6 \\ 0.8 \end{bmatrix}$$

In this example, the calculations are illustrated using only two angles of incidence for a single wavelength, are provided. In particular, the convolution is calculated for angle of incidence ranging from 0 to 10° with a step size of 10°. In practice, a larger range of angles may be used and the step size may be different. Likewise, it is to be understood that, values for various wavelengths may be identified at any particular angle of incidence (or angle of view); in this example, only 0° and 10° are being used.

Also, there are many different wavelengths at each angle of view; however only two values (0.5 and 0.9) for the wavelength, $\lambda$, are provided at 0 degrees (angle of incidence $\theta_i$ or angle of view) for illustration only. Similarly, two values (0.6 and 0.8) for the wavelength, $\lambda$, are provided at an angle of view of 10 degrees.

To verify that the selected diffuser 402 performs the intended color shift compensation, for example, one may compute R'($\theta$, $\lambda$) using the actual optical response D($\theta_i$, $\theta$) of the diffuser 402. To determine such compensated optical response R'($\theta$, $\lambda$) of the modulator 401 as modified by the diffuser 402, the equation above is used to compute R'($\theta$, $\lambda$) at a desired angle of view. In this example, the optical response D ($\theta_i$, $\theta$) is used and it is assumed that D(0°, 10°)=0.5 and D(10°, 10°)=0.2 to compute the effect of the diffuser 402 at an angle of view 10°. It is to be recognized that these numbers have been selected arbitrarily to illustrate the principle described herein and are not limiting. Moreover, as discussed above, the convolution may be performed for a greater number of angles of incidence $\theta_i$, even though in this numeric example only values at two values of $\theta_i$ are provided for D($\theta_i$, $\theta$), i.e., 0.2 and 0.5.

In performing the convolution of D($\theta_1$, $\theta$) with R($\theta_i$, $\lambda$), R'($\theta$, $\lambda$) can be computed at an angle of view of 10° (or at any desired angle of view, e.g., between 0° and 90°, in a like manner). In performing the convolution in this particular example, each value for D($\theta_i$, $\theta$) that is used is obtained from the D($\theta_i$, $\theta$) curve at the angle of view (in this example, $\theta$=10°) for all values of $\theta_i$.

As noted above, for each angle of view computation, the convolution is summed by varying $\theta_i$; from 0° to 90° to compute the total modified or compensated optical response R'($\theta$, $\lambda$) (as corrected by the diffuser 402). In this numeric example, the computation may operate as follows:

$$R'(10°, \lambda) = D(0°, 10°) * R(0°, \lambda) + D(10°, 10°) * R(10°, \lambda)$$

$$= [0.50] * \begin{bmatrix} 0.5 \\ 0.9 \end{bmatrix} + [0.20] * \begin{bmatrix} 0.6 \\ 0.8 \end{bmatrix} = \begin{bmatrix} 0.25 \\ 0.45 \end{bmatrix} + \begin{bmatrix} 0.12 \\ 0.16 \end{bmatrix} = \begin{bmatrix} 0.37 \\ 0.61 \end{bmatrix}$$

In some embodiments, the diffuser 402 may include more than one diffuser layer. In one such embodiment, the same diffuser characteristics may be selected for each of the diffuser layers. In another embodiment, different characteristics may be selected for each of the layers of the diffuser 402. In one embodiment, the diffuser characteristics of the diffuser 402 may be calculated by convolving the optical responses of each of the layers.

Figure 13:
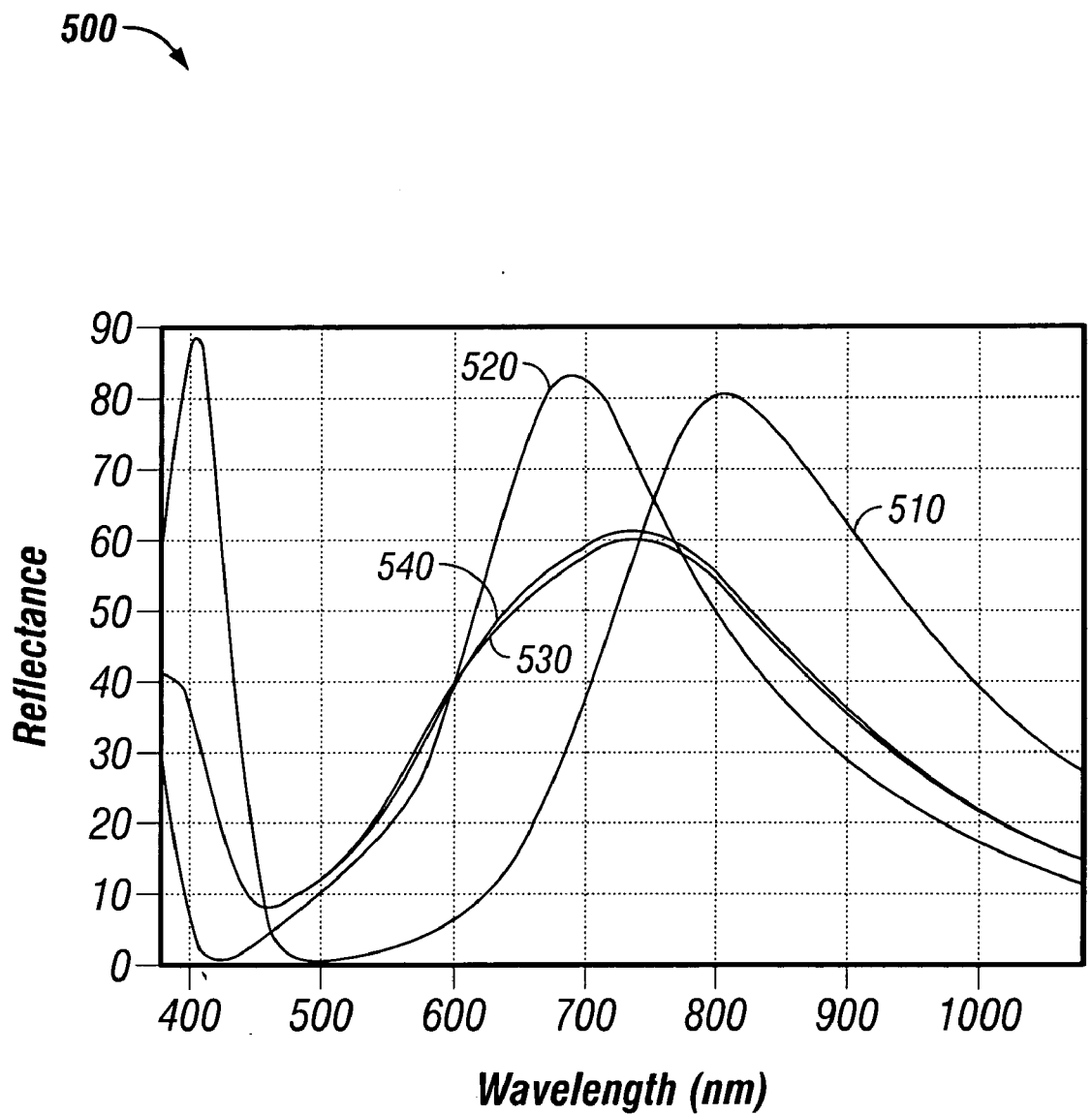
FIG. 13 is an exemplary graphical diagram of reflectance versus wavelength of light illustrating variation in spectral responsivity of the interferometric modulators with angle and the effects of the diffuser on the variation in spectral responsivity.

FIG. 13 illustrates a graphical diagram 500 of several spectral reflectance traces for various configurations of interferometric modulator display devices. As shown in FIG. 13, the vertical axis represents a reflectance to the viewer, expressed as a percentage (from 0 to 90%). The horizontal axis represents the wavelength of light that is reflected by the interferometric modulator. This reflectance corresponds to the spectral responsivity e.g., R($\theta_i$, $\lambda$), R'($\theta$, $\lambda$), described above.

As further shown in FIG. 13, curve 510 depicts a somewhat bell-shaped curve that represents the reflectance as viewed at 0 degrees to normal from the display of one or more interferometric modulators (without the presence of a diffuser layer). The peak of curve 510 is at approximately 80% reflectance and is centered about 820 nm, which is in the infrared portion of the spectrum.

FIG. 13 further depicts a curve 520 that represents the reflectance of this same display as viewed at 50 degrees to normal. The curve 520 is shaped similarly to the curve 510 but has a peak value of reflectance of approximately 84% that is located at about 690 nm.

FIG. 13 also depicts a somewhat bell-shaped curve 530 that represents the reflectance as viewed at 0 degrees to normal from a display that includes a diffuser layer. The curve 530 has a peak gain of approximately 64% that is located approximately at 750 nm. FIG. 13 depicts a curve 540 that represents the reflectance of the display having the diffuser layer as viewed at 50 degrees to normal. The curve 540 follows a path that is substantially the same as the path of curve 530 with a slightly smaller peak reflectance value of 62%.

FIG. 13 shows the reflectance from the modulator using input light to the interferometric modulator that is in the infrared portion of the electromagnetic spectrum at about a peak wavelength of 810 nanometers (nm). As can be seen by comparing the curves 510 and 530 to each other, the 50 degree shift in viewing angle causes an approximately 120 nm color shift in the viewed response profile. The curves 530 and 540 illustrate the spectral reflectance of the modulator when viewed through a very low gain diffuser 302 having a full width half maximum gain between 120° and 180°. Mathematically, the curves 530 and 540 represent the convolution of the response of this very low gain diffuser with that of the interferometric modulator. As shown in FIG. 13, both curves 530 and 540 peak at about the same or a similar wavelength that is horizontally between the peaks of curves 510 and 520. The curves thus exhibit a very minor perceived color shift (such as in the range of about 10 to 20 nm) when the viewing angle changes by fifty degrees (50°), as in this example.

As compared to the 120 nm color shift of the modulator viewed at 50° without the diffuser layer, the diffuser layer has thus been substantially compensated for the shift in viewing angle. The peaks of the curves 530 and 540 do not shift in color substantially with changing viewing angle.

Additionally, the peaks of curves for the modulator without the diffuser that were in the infrared portion of the spectrum are in the red portion of the spectrum with the low gain diffuser. The diffuser has therefore shifted the spectral responsivity of an interferometric modulator have a peak response in the infrared to a device having a peak in a visible wavelength. Another characteristic of the effect of the diffuser is that the peak spectral reflectance of the convoluted, e.g., perceived, light signal is reduced and spread more evenly across the spectrum.

The color shift and the amount of the drop in peak reflectance may be controlled by selecting the desired wavelength and angle for the peak of the curve for a diffuser. In one embodiment, the selected diffuser may have a response that is centered about 0°. In other embodiments, the selected diffuser may have a response centered around an angle other than 0°, for example, centered at ten (10°), twenty (20), thirty (30), forty (40), 45 (forty five), 50 (fifty), 60 (sixty), 70 (seventy), 80 (eighty) degrees, or on any other view angle.

Figure 14:
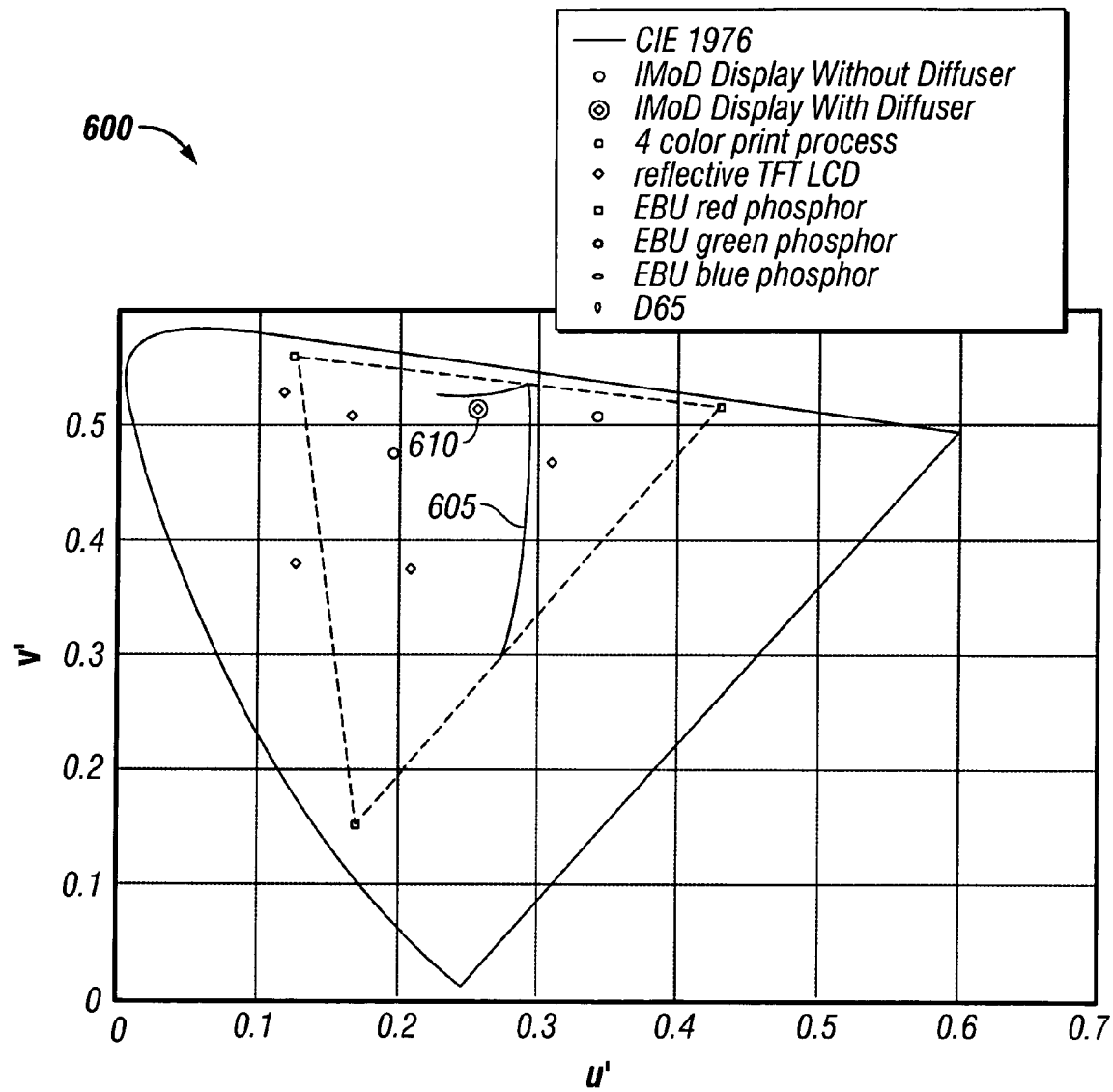
FIG. 14 is a graphical diagram of color shift versus view angle illustrating an exemplary effect of the diffuser.

FIG. 14, is a CIE 1976 chromaticity diagram 600 that illustrates a sequence of data points that show color shift versus view angle to further illustrate the effect of the embodiment of the diffuser 401 from FIG. 13. The horizontal and vertical axes define a chromaticity coordinate system on which spectral tri-stimulus values may be depicted. A sequence of data points for an interferometric modulator display without diffuser is shown on the gamut color space of the diagram along a trace 605. The curve of the trace 605 indicates that there is a considerable color shift for changes in the view angle. For the interferometric modulator display with the very low gain response, such as shown in traces 530 and 540 of FIG. 13, a single data point 610 is shown on the diagram 401 because the color shift has been substantially eliminated by use of the diffuser layer More generally, a diffuser can be selected having specific properties that produce a desired spectral responsivity, $R'(\theta, \lambda)$. Examples of properties that can be varied include the shape of the optical response $D(\theta_i, \theta)$. As discussed above, the diffuser may comprise, e.g., a non-lambertian diffuser such as a high gain, low gain, or very low gain diffuser. In the case where the optical response $D(\theta_i, \theta)$ comprises a peak, the width of this peak can be selected. For example, peaks as measured at full width half maximum may be between about 2° to 20° wide in some embodiments or between about 20° to 120° wide or larger or smaller. Peaks widths outside these ranges are also possible. In addition, the position of this peak can be controlled. Although the high and low gain response shown in FIG. 10 are centered about 0°, in certain embodiments, diffusers having peaked optical response with peak at locations other than 0° may be used. Other properties of the diffuser may be varied as well.

For example, the optical responses depicted in FIG. 10 are for a particular angle of incidence; however, $D(\theta_i, \theta)$ is also a function of $\theta_i$. In various embodiments, therefore, the diffuser may be configured to provide different optical responses $D(\theta)$ for light incident at different angles of incidence $\theta_i$. For example, the diffuser may be designed such that the width and location of peaks in the optical response are different for differing angles of incidence. The peak may for example be located at an angle of view equal (but opposite) to the angle of incidence. Alternatively, the angle of view of the peak may be different in magnitude from the angle of incidence.

Since the spectral responsivity of the interferometric modulator varies with angle, different responses for different angles of incidence may be employed to redistribute the rays to achieve the desired dependency of color on view angle. Accordingly, reduced color shift may be achieved by properly distributing the light incident on the diffuser at different angles.

Thus, by selecting the different features of the optical response $D(\theta_i, \theta)$, the desired spectral responsivity $R'(\theta, \lambda)$ may be obtained. Consideration of the spectral responsivity $R(\theta_i, \lambda)$ of the interferometric modulator may be used in determining the properties of such a suitable diffuser. Accordingly, a diffuser may be selected that appropriately matches the interferometric modulator so as, for example, to reduce color shift.

As described above, using techniques known in the art, the selection and/or design of the diffuser may be based on the known spectral and angular optical response of diffuser materials and architectures. In particular, the diffuser is selected or designed so that the convolution of the diffuser's optical response with that of the interferometric modulator 401 produces an optical response that decreases the color shift. Thus, the color shift as viewed from at least one target angle may be reduced to within a predetermined tolerance for a particular viewing angle and particular interferometric modulator configuration 401. The predetermined tolerance may be expressed as a number of nanometers of color shift.

Holographic or diffractive optical elements may be employed as the diffuser. The diffusers may also be computer generated. In one embodiment, the desired optical response for the diffuser is produced by selecting materials, thicknesses, and arrangement of the materials of the diffuser to produce the desired optical response for the diffuser.

In certain embodiments, the interferometric modulator has a spectral response (e.g., for viewing angles at normal incidence) that is centered in the infrared or other non-visible wavelength. Such a spectral response having mostly non-visible components may contribute to reduced color shifting. For example 50%, 60%, 70% or more of the wavelengths under a central peak that extends in the visible may be non-visible. The diffuser may shift this peak into the visible.

In certain embodiments, the diffuser may exhibit a response $D(\theta_i, \theta, \lambda)$ that is a function of wavelength. In one embodiment, the diffuser includes a holographic optical element. Other types of wavelength sensitive diffusers may be employed as well.

In addition, in embodiments where a shift to the blue end of the spectrum is desired, a back light or front light may be added to provide additional intensity at desired wavelengths. The use of such frequency dependent diffuser configurations and light sources provides additional flexibility in selecting a configuration that may be viewed at a selected angle with a predetermined tolerance on color shift.

In one embodiment, the display 400 may include interferometric modulators 401 that have varying optical responses. For example, in one embodiment the display 400 includes three groups of interferometric modulators 401 having optical responses that, when the modulators 401 are matched with the diffuser 402 as disclosed herein, correspond to red, green, and blue to produce a color display. In one such embodiment, the optical response of diffuser 402 may depend on the wavelength $\lambda$ of light passing through the diffuser 402. In one such embodiment, the diffuser 402 comprises a holographic optical element.

Variations in the design of the display are possible. For example, in some embodiments, a combination of several diffusers may be used to provide a display with angular color shift at a selected angle that is within a predetermined tolerance. In another embodiment, one or more diffusers may be used to provide a color shift that is within a predetermined tolerance for two, three, or a range of angles. Still other configurations are possible.

In one embodiment, an application of the interferometric modulator with diffuser is to enable encryption or obscuring of the image of a display to secure the image from unauthorized viewing. In one embodiment, the diffuser moves data from an invisible portion of the spectrum, e.g., infrared, to a visible portion of the spectrum. The diffuser may be positioned with respect to the interferometric modulator array so that authorized viewers receive light from the display through the diffuser.

Thus, in such an embodiment, the interferometric modulator produces an encrypted image and the diffuser is configured to decrypt the image. In another embodiment, the interferometric modulator array of the display has an optical response that is selected to receive input image data and produce an output image that is difficult for the human eye to perceive, for example, in which colors are shifted such that the image is obscured. The diffuser is selected to shift the colors to a produce an image with colors indicative of the input image data.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive.

What is claimed is:

1. A display comprising:
    at least one interferometric modulator configured to reflect incident light, the at least one interferometric modulator having an optical response that depends at least in part on angle of view and wavelength of the incident light; and
    a diffuser positioned in an optical path to the at least one interferometric modulator, the diffuser having an optical response that is substantially matched to the optical response of the interferometric modulator to maintain substantially the same composition of color at different angles of view.

2. The display of claim 1, wherein the optical response of the diffuser depends at least in part on angle of view.

3. The display of claim 1, wherein the diffuser comprises a non-lambertian diffuser.

4. The display of claim 1, wherein the optical response of the diffuser falls off with angle of view.

5. The display of claim 1, wherein the diffuser comprises a high gain diffuser.

6. The display of claim 5, wherein the high gain diffuser has a full width at half maximum of between about 10° and 30°.

7. The display of claim 1, wherein the diffuser comprises a low gain diffuser.

8. The display of claim 7, wherein the low gain diffuser has a full width at half maximum of between about 60° and 100°.

9. The display of claim 1, wherein the diffuser and interferometric modulator are configured to produce a combined optical response that reduces angular color shift to less than about 10 to 20 nanometers for an angle-of-view change of about 50 degrees.

10. A display comprising:
    at least one interferometric modulator having a spectral responsivity that varies with angle of view, $\theta$, such that color varies with angle of view; and
    a non-lambertian diffuser positioned in an optical path to the at least one interferometric modulator, the non-lambertian diffuser having an optical response that varies with angle of view, said diffuser substantially reducing variation of color with angle of view.

11. The display of claim 10, wherein the spectral responsivity of the interferometric modulator for a normal angle of view of 0° includes a spectral line that is centered about a non-visible wavelength and that extends into visible wavelengths.

12. The display of claim 11, wherein the spectral line is centered in the infrared.

13. The display of claim 11, wherein the spectral line is centered at a wavelength between about 700 to about 1000 nanometers.

14. The display of claim 11, wherein said interferometric modulator together with said diffuser have a spectral responsivity for said normal angle of view having a spectral line centered in the visible wavelength range.

15. The display of claim 10, wherein the diffuser comprises a high gain diffuser.

16. The display of claim 10, wherein the diffuser comprises a low gain diffuser.

17. The display of claim 10, wherein the optical response of the diffuser has a peak value at a non-zero angle of view for a normal angle of incidence.

18. The display of claim 17, wherein the optical response of the diffuser has a peak value at an angle of view greater than about 5 degrees for light incident on the diffuser at an angle of incidence, $\theta_i$, of about 0°.

19. The display of claim 10, wherein the optical response of the diffuser is dependent on angle of incidence of light on the diffuser.

20. The display of claim 19, wherein the optical response of the diffuser is peaked at an angle of view that is unequal to the angle of incidence of the light on the diffuser.

21. The display of claim 20, wherein said peaked angle of view is different for different angles of incidence.

22. The display of claim 10, wherein to optical response of to diffuser further depends onto wavelength of light.

* * * * *

UNITED STATES PATENT AND TRADEMARK OFFICE
CERTIFICATE OF CORRECTION

PATENT NO. : 7,630,123 B2  Page 1 of 1
APPLICATION NO. : 11/040824
DATED : December 8, 2009
INVENTOR(S) : Manish Kothari It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 492 days.

Signed and Sealed this

Second Day of November, 2010

David J. Kappos
*Director of the United States Patent and Trademark Office*